US011772797B2

(12) United States Patent
Maurmaier et al.

(10) Patent No.: US 11,772,797 B2
(45) Date of Patent: Oct. 3, 2023

(54) INTEGRATED AIRCRAFT PASSENGER ENTERTAINMENT DEVICE, AIRCRAFT PASSENGER SEAT AND AIRCRAFT

(71) Applicant: AIRBUS (CHINA) ENTERPRISE MANAGEMENT AND SERVICES COMPANY LIMITED, Beijing (CN)

(72) Inventors: Andreas Maurmaier, Guangdong (CN); Alejandro Morales-Anton, Guangdong (CN); Yiwen Mai, Guangdong (CN); Yuxin Luo, Guangdong (CN)

(73) Assignee: AIRBUS (CHINA) ENTERPRISE MANAGEMENT AND SERVICES COMPANY LIMITED, Beijing (CN)

( * ) Notice: Subject to any disclaimer, the term of this patent is extended or adjusted under 35 U.S.C. 154(b) by 17 days.

(21) Appl. No.: 17/209,728

(22) Filed: Mar. 23, 2021

(65) Prior Publication Data

US 2021/0300563 A1    Sep. 30, 2021

(30) Foreign Application Priority Data

Mar. 24, 2020   (CN) .......................... 202010212282.7

(51) Int. Cl.
*B64D 11/00* (2006.01)
*B64D 11/06* (2006.01)

(52) U.S. Cl.
CPC .. *B64D 11/00151* (2014.12); *B64D 11/00155* (2014.12); *B64D 11/0636* (2014.12); *B64D 11/0638* (2014.12)

(58) Field of Classification Search
None
See application file for complete search history.

(56) References Cited

U.S. PATENT DOCUMENTS

| 10,671,118 B1 * | 6/2020 | Zhang .................... G06F 1/1639 |
| 11,325,709 B1 * | 5/2022 | Wanner ............ B64D 11/00152 |
| 11,426,774 B1 * | 8/2022 | Karri ...................... G01N 21/94 |
| D977,447 S * | 2/2023 | Jeon ......................... G09F 9/301 |
| | | D14/133 |
| 2003/0233659 A1 | 12/2003 | Guerin et al. |

(Continued)

FOREIGN PATENT DOCUMENTS

| CN | 113053242 B * | 7/2022 | ............. F16M 11/14 |
| JP | 2002036968 A * | 2/2002 | |

(Continued)

OTHER PUBLICATIONS

Extended European Search Report for European Application No. 21164259.0, nine pages, dated Jul. 29, 2021.

*Primary Examiner* — David E Allred
(74) *Attorney, Agent, or Firm* — Nixon & Vanderhye P.C.

(57) ABSTRACT

An aircraft passenger entertainment device for an aircraft passenger seat is disclosed having a cover member attached to the seat so as to serve as a functional accessory for providing additional functions other than a seating function to the seat; a display screen movably attached to at least one surface of the cover member; and a controller embedded on a surface or inside of the cover member and in communication with the display screen. The cover member is attachable and detachable to a rear facing surface of a backrest of the seat above a passenger knee level.

19 Claims, 9 Drawing Sheets

(56) References Cited

U.S. PATENT DOCUMENTS

| | | |
|---|---|---|
| 2006/0075934 A1 | 4/2006 | Ram |
| 2011/0095577 A1* | 4/2011 | Kennard ............ B64D 11/0638 297/146 |
| 2012/0248833 A1* | 10/2012 | Hontz .............. B64D 11/00152 297/188.05 |
| 2013/0093220 A1 | 4/2013 | Pajic |
| 2014/0233203 A1* | 8/2014 | Ohtomo ............ G02F 1/133308 361/809 |
| 2015/0108798 A1* | 4/2015 | Boyer, Jr. .............. B60N 3/004 297/188.05 |
| 2015/0175265 A1* | 6/2015 | Thiele .............. B64D 11/00152 297/188.04 |
| 2015/0219902 A1* | 8/2015 | Kim ........................ G06F 3/013 345/8 |
| 2017/0088265 A1 | 3/2017 | Brick |
| 2017/0210472 A1* | 7/2017 | Salazar ................. G03B 21/62 |
| 2018/0099752 A1* | 4/2018 | Johnson ................ B64D 11/06 |
| 2018/0339777 A1* | 11/2018 | Yaghoubi ........... B64D 11/0646 |
| 2019/0023186 A1* | 1/2019 | Hu ......................... B60R 7/043 |
| 2019/0068944 A1* | 2/2019 | Zhang ................. G02B 27/017 |
| 2020/0019368 A1* | 1/2020 | Ku ....................... G06F 1/1654 |
| 2020/0324903 A1* | 10/2020 | Morales Anton ............................ B64D 11/00152 |
| 2021/0116975 A1* | 4/2021 | Moon .................... G06F 1/1656 |
| 2021/0166612 A1* | 6/2021 | Lee ........................ G09G 3/2092 |
| 2021/0179269 A1* | 6/2021 | Thomas .................... H01F 7/02 |
| 2021/0191468 A1* | 6/2021 | Nakamura ............. H10K 50/00 |
| 2021/0206464 A1* | 7/2021 | Narvaez-Gracia ....... B60Q 3/41 |
| 2021/0229813 A1* | 7/2021 | Glain ................ B64D 11/0606 |
| 2021/0249495 A1* | 8/2021 | Lee ........................ G06F 3/0412 |
| 2021/0316867 A1* | 10/2021 | Ruiz Lara .......... B64D 11/0638 |
| 2021/0407333 A1* | 12/2021 | He ......................... G06F 1/1652 |
| 2022/0132680 A1* | 4/2022 | Liu ....................... H10K 77/111 |
| 2022/0238047 A1* | 7/2022 | Shin ........................ G09F 9/301 |
| 2022/0402801 A1* | 12/2022 | Benjamin ............... B32B 27/06 |
| 2023/0122385 A1* | 4/2023 | Wang .................... F16M 11/18 248/176.3 |
| 2023/0162632 A1* | 5/2023 | Bruce ................ G06Q 30/0244 40/320 |

FOREIGN PATENT DOCUMENTS

| | | | |
|---|---|---|---|
| MA | 40152 B1 * | 6/2018 | |
| WO | WO-2016057067 A1 * | 4/2016 | ............... A47F 5/10 |

* cited by examiner

INTEGRATED AIRCRAFT PASSENGER ENTERTAINMENT DEVICE, AIRCRAFT PASSENGER SEAT AND AIRCRAFT

CROSS REFERENCE TO RELATED APPLICATION

This application claims priority to Chinese patent application No. 202010212282.7, filed Mar. 24, 2020, the entire contents of which is hereby incorporated by reference.

FIELD OF THE INVENTION

The present application relates to an aircraft passenger entertainment device capable of being integrated in an aircraft passenger seat, an aircraft passenger seat integrated with the aircraft passenger entertainment device, and an aircraft having the aforementioned aircraft passenger entertainment device or the aforementioned aircraft seat.

BACKGROUND OF THE INVENTION

Passenger seats of aircraft are usually equipped with other functional accessories that provide passengers with additional services to improve ride comfort. Even seats of an economy class section having limited seating space are often equipped with foldable tray tables and literature pockets on the backrest of the seat for the convenience of passengers behind the seat. In addition, most seats are provided with passenger entertainment devices. These passenger entertainment devices typically include a display screen which is attached, for example, to a rear facing surface of the backrest of the passenger seat, such that passengers sitting in a seat row behind the seat row including the passenger seat equipped with the display screen can view an entertainment program, for example, a movie or a video game.

However, these functional accessories inevitably require a certain amount of space. In the case of limited seating space, especially in the economy class section, it is not ideal to use too much space to arrange these functional accessories. In particular, since a space between adjacent front and rear rows of seats determines the size of the passenger legroom, if additional accessories are added at the backrest of the seat below the passenger knee level (KL) at the expense of legroom, ride comfort will be greatly reduced. Here, the term "passenger knee level" refers to the knee level of a passenger in a sitting position. "Passenger knee level" is generally an important reference parameter in the design of a seat, especially the design of the backrest structure and seat pitch of a passenger seat. Therefore, herein, the term "passenger knee level" will have a broader concept, that is "passenger average knee level". Generally, in seats of the same specification or type, the "knee level" may have a uniform value, such as 0.5 m, 0.6 m, etc., or a uniform value range, such as a range of 0.45 m to 0.6 m.

SUMMARY OF THE INVENTION

An object underlying the present disclosure is to provide a solution capable of adding functional accessories to an aircraft passenger seat while ensuring an expanded seating space, especially legroom.

Another object underlying the present disclosure is to provide an easy-to-maintain aircraft passenger entertainment device that is more versatile when compared with state of the art passenger seats, for example by being more adaptable and interchangeable with other different types of passenger seat.

A further object underlying the present disclosure is to provide an aircraft passenger entertainment device with flexible structure, high adjustability and/or optionality, and capable of better meeting customized requirements of passengers.

A still further object underlying the present disclosure is to equip a seat of an aircraft with a passenger entertainment device in a cost-saving and lightweight manner.

In order to achieve at least one of the above objects, according to one aspect of the present disclosure, a passenger entertainment device integrated in an aircraft seat is provided. The passenger entertainment device includes: a cover member which is attachable and detachable to an aircraft seat so as to serve as a functional accessory for providing additional functions other than a seating function to the seat; a display screen which is attached to at least one surface of the cover member; and a controller, which is embedded on a surface or inside of the cover member and is configured to control operation of the display screen; wherein the cover member is attachable and detachable to a rear (or aft) facing surface of a backrest of the seat above the passenger knee level.

Since the passenger entertainment device is directly integrated into the functional accessories of the seat, as compared with to the existing technical solution of additionally arranging entertainment devices, the solution hereby does not hinder the arrangement of the existing functional accessories, nor leads to a reduction in seat pitch. Therefore, the passenger entertainment device is capable of saving seat space.

Preferably, the display screen is a flexible OLED (organic light-emitting diode) display screen. More preferably, the display screen is a touch-sensitive OLED display screen. Therefore, the integrated passenger entertainment device according to the present disclosure is very light and thin and thus is more conducive to saving space and weight. In addition, the OLED type of display screen requires electrical power to operate and therefore they helps to reduce energy consumption of the aircraft. Furthermore, currently there is a desire to have aircraft passenger seats with curved surfaces that improve the aesthetic appearance of the overall cabin. This means it may be desirable to use a cover member that has a non-planar curved shape. Use of a flexible display screen enables the use of more non-planar cover member designs as they can conform to curved surfaces.

Preferably, the cover member includes: a standard portion, which has a fixed shape, the display screen and the controller being installed thereto so as to constitute a main part of the passenger entertainment device together with the standard portion; and a customizable portion, of which the shape is adaptable so that the customizable portion and the standard portion can constitute the functional accessory together. This configuration makes the passenger entertainment device according to the present disclosure more convenient for mass production, especially when existing seat accessories need to be replaced, and is helpful for reducing research work, thus not only improves production efficiency, but also helps to save production costs and installation costs.

The aircraft passenger entertainment device includes a connection mechanism that fixes the display screen to the cover member, and the connection mechanism is configured to allow a change of angle and/or position of the display screen with respect to the cover member. The connection mechanism is a hinge device that allows the display screen to pivot with respect to the cover member; or the connection mechanism is a magnetic connector, a clamping element or an adhesive agent arranged to allow the degree of curvature of the display screen to be changed by virtue of the own flexibility of the display screen.

With the connection mechanism, the passenger entertainment device of the present application allows passenger to adjust viewing angle as needed by changing the overall inclination angle and position of the display screen with respect to the shell plate, and/or changing the shape of the display screen by means of the own flexibility of the display screen, which greatly improves the adjustability of the passenger entertainment device and improve the comfortable sensation of the passenger using the passenger entertainment device. In addition, such connection mechanism enables the passenger to optimize the viewing angle as demand without compromising the dimension of other structures of the seat, for example, the volume of the literature pocket, the thickness of backrest and the like.

Preferably, the aircraft passenger entertainment device further includes an adjustment device for adjusting the curvature of the display screen by changing a distance between two opposite edges of the display screen. Preferably, the adjustment device further includes a control element arranged on the cover member, and the passenger can control the adjustment device by operating the control element so as to adjust the curvature of the display screen.

Such means for adjusting the curvature of the display screen allows passengers to flexibly adjust the angle or curvature of the display screen to suit their different viewing angles, which makes the passenger entertainment device according to the present disclosure possess high adjustability and therefore improves seat comfort. In addition, such adjustment device enables the passenger to optimize the viewing angle as demand without compromising the dimension of other structures of the seat, for example, the volume of the literature pocket, the thickness of backrest and the like. Furthermore, such adjustment device has the characteristics of small size, light weight, and concealment, and will not unfavorably affect the size, weight, and aesthetics of the passenger entertainment device.

Preferably, the cover member is embodied as a shell plate of a literature pocket attached to the upper part of the backrest of the seat, wherein the display screen is arranged on a side of the shell plate of the literature pocket facing a passenger behind the seat.

Optionally, the cover member is embodied as a conventional foldable tray table attached to the backrest of the seat, wherein the display screen is arranged on a first surface of the foldable tray table facing the passenger behind the seat in a folded position; or arranged on a second surface of the foldable tray table opposite to the first surface; or arranged on both the first surface and the second surface.

The design of integrating a display device into a shell plate of conventional literature pocket or a conventional foldable tray table makes the present invention have obvious advantages over the prior art. On the one hand, such design allows the literature pocket to still be arranged at the upper part of the backrest of the seat without being displaced below the knee level, thereby ensures that the legroom will not be reduced; on the other hand, the embedded light and thin display screen eliminates the need to change the size of the shell plate of the existing literature pocket or foldable tray table, which makes the passenger entertainment device according to the invention highly adaptable to a wide range of new or existing seat designs.

Preferably, the controller is arranged on a rear facing surface of the display screen. This arrangement of the controller can leave more arrangement space for the display screen, and make the surface facing the passenger simple and aesthetic.

Preferably, the passenger entertainment device obtains data via a wireless network system, which, on the one hand, allows passengers to search, select and view the contents they are interested in freely, and thus better meets the customized information requirements of passengers and improves the ride comfort of passengers; and on the other hand, eliminates the need for physical connectors such as cables, thus is not only conducive to the simplicity of the structure of the equipment, but also facilitates the installation and removal of the equipment.

Preferably, the passenger entertainment device is independently powered via a power source of the seat, which allows passengers to switch ON/OFF the passenger entertainment device according to personal requirements and thus is not only beneficial to meet the personal electricity demand of passengers, but also reduce energy consumption.

Preferably, the passenger entertainment device further includes an interface accessory that allows an external electronic device to perform data transmission with the passenger entertainment device. The interface accessory is integrated in the cover member and located outside an HIC (Head Injury Criteria) area. The interface accessory includes a USB (Universal Serial Bus) interface and an audio interface.

Preferably, the passenger entertainment device is capable of communicating with external electronic devices via a wireless connection.

Preferably, the passenger entertainment device is capable of being used as a keyboard of the external electronic device.

Preferably, the passenger entertainment device is installed to the seat via standard electrical connectors and standard mechanical connectors.

Therefore, the passenger entertainment device is a highly adaptable and easy-to-maintain passenger entertainment device, and has greater optionality in terms of viewing modes and contents, and can fully meet customized requirements of passengers. Said device is also easily replaceable with another, which enables quicker repair, maintenance of the device, without obstructing operations of the aircraft in which it is fitted.

It is also an object of the present disclosure to provide an economical aircraft passenger seat having improved comfort.

In order to achieve the above object, according to one aspect of the present disclosure, a passenger seat for an aircraft is provided. The seat includes: a seat body, which includes a seat portion and a backrest; and at least one functional accessory, which is attached to the seat body to provide additional functions other than the seating function to the seat. In particular, the at least one functional accessory includes the passenger entertainment device described above.

Preferably, the seat further includes: a seat power source, which can power the passenger entertainment device installed thereto and thus is conducive to meeting the electricity demand of individual passengers and power conservation; and connection devices suitable for the engagement with the standard electrical connector and the standard mechanical connector of the passenger entertainment device, which additionally allow the convenient connection between the seat and most electronic devices and thus improve the seat versatility.

It is also an object of the present disclosure to provide an aircraft that improves passenger ride comfort in an economical and simple manner.

According to another aspect of the present disclosure, an aircraft is further provided. The aircraft is provided with the passenger entertainment device as described above or at least two seats wherein the forward most seat is the seat as described above.

Preferably, the aircraft is further provided with: a wireless network system being capable of providing data for the passenger entertainment device, which is beneficial to meet the customized information requirements of passengers and improve the ride comfort of passengers; and a seat power supply system, which includes seat power source provided on each seat to enable independent powering of the passenger entertainment device installed on the seat, and thus is conducive to meeting the personal electricity demand of passengers and power conservation.

Features and other advantages of the present disclosure will become apparent from the following non-limiting detailed description.

BRIEF DESCRIPTION OF THE DRAWINGS

Features and advantages of one or more embodiments of the present disclosure will become easier to be understood through the following description in conjunction with the drawings, in which.

In all the drawings, corresponding reference numerals indicate corresponding parts.

DETAILED DESCRIPTION

Figure 1A:
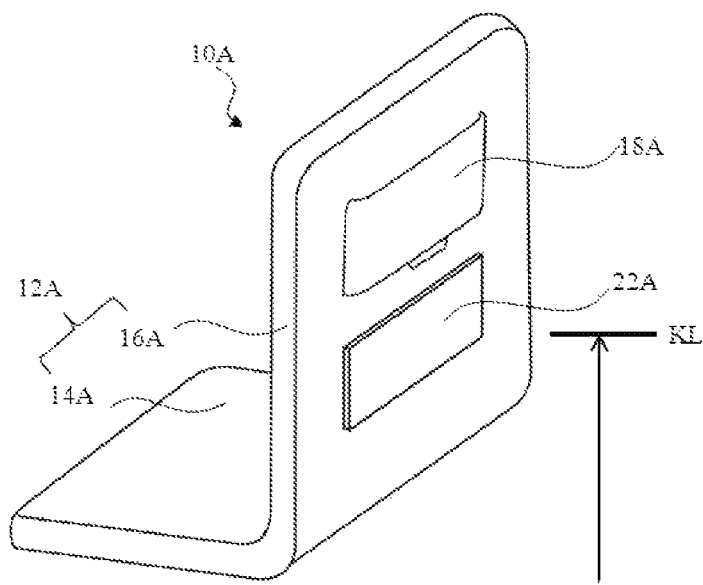
FIGS. 1A and 1B are schematic views showing a passenger seat of existing technology separately.

The present disclosure is further described in detail hereinafter in conjunction with the drawings and the exemplary embodiments. The following detailed description of the present disclosure is merely exemplary and is by no means intended to limit the present disclosure, its application or usage.

The terms first, second, third, etc. will be used herein to describe various elements, components, regions, layers and/or sections, but these elements, components, regions, layers and/or sections should not be restricted by these terms. These terms may be used only to distinguish one element, component, region, layer or section from another element, component, region, layer or section. Terms such as "first," "second," and other numerical terms do not imply a sequence or order unless the context clearly indicates otherwise. Thus, a first element, component, region, layer, or section discussed below may also be referred to as a second element, component, region, layer, or section without departing from the indication of the exemplary configurations.

In description of the present disclosure, it should be understood that an orientation or a position relation indicated by terms "upper", "lower", "front", "rear" or the like is described based on an orientation or a position relation shown in the drawings, and is only used for describing the present disclosure and simplifying the description, rather than indicating or implying that a device or element related to the terms has a specific orientation or is constructed and operated in a specific orientation. Therefore, the terms should be not construed as a limitation to the present disclosure.

Figure 1B:
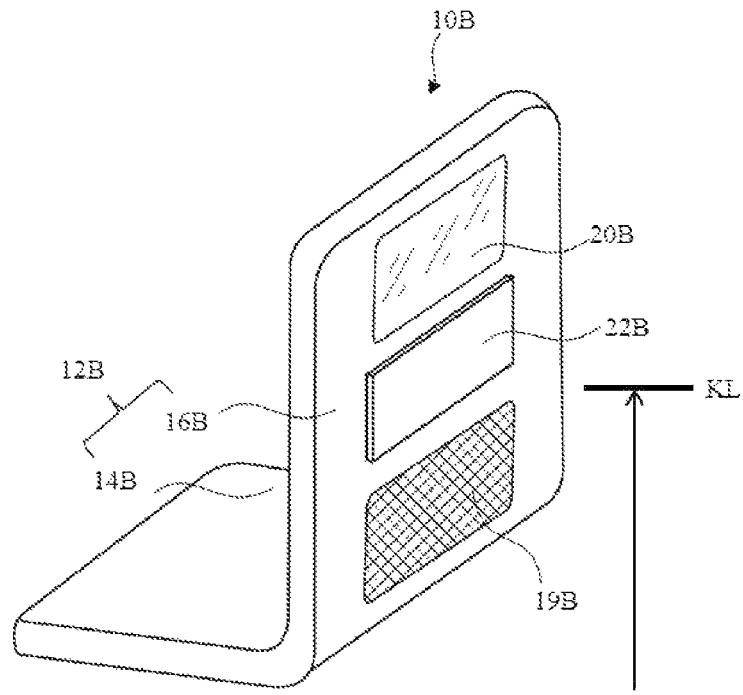

FIGS. 1A and 1B show two existing passenger seats 10A and 10B, respectively. The passenger seats 10A and 10B respectively includes a seat body 12A, 12B having a seat portion 14A, 14B and a backrest 16A, 16B, as well as functional accessories capable of providing additional functions to the passenger seat. The so-called "additional functions" herein refer to functions other than the seating function necessary for the seat itself, and "functional accessories" are accessories capable of providing functions other than the seating function, in particular leisure and entertainment functions. In the existing passenger seats, literature pockets 18A, 19B for containing books, newspapers, personal items and other publications for passengers to read, and foldable tray tables 22A, 22B that are convenient for passengers to place personal items and catering are the most common functional accessories in passenger seats. Arranging extra accessories at the backrest of the seat below the knee level (as indicated by the straight line KL in FIGS. 1A and 1B) is generally avoided, as in seat 10A, considering that it will take up a space between front and rear seats thus reduce the passenger legroom and decrease the seat comfort. In order to improve the entertainment functions of the seats, some seats also have entertainment devices such as a display screen 20B. In a case that the display screen 20B is installed at an upper part of the backrest, the literature pocket 19B is usually made from a thin sheet such as a simple mesh bag or fabric attached to the backrest 16B for saving space, just as in seat 10B, but which still inevitably takes the legroom of passengers.

An improved seat is provided according to the present disclosure. In particular, the seat improves the entertainment functions of the seat by ensuring that the legroom is expanded, which is only possible by means of an integrated passenger entertainment device.

Figure 6:
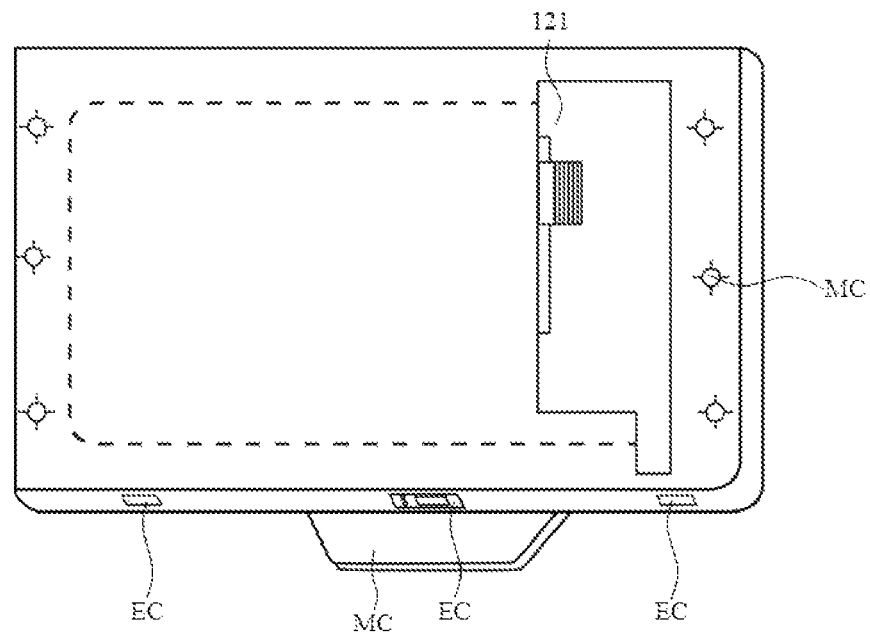
FIG. 6 is a back view of a cover member of the passenger entertainment device according to an embodiment of the present disclosure.
Figure 7:
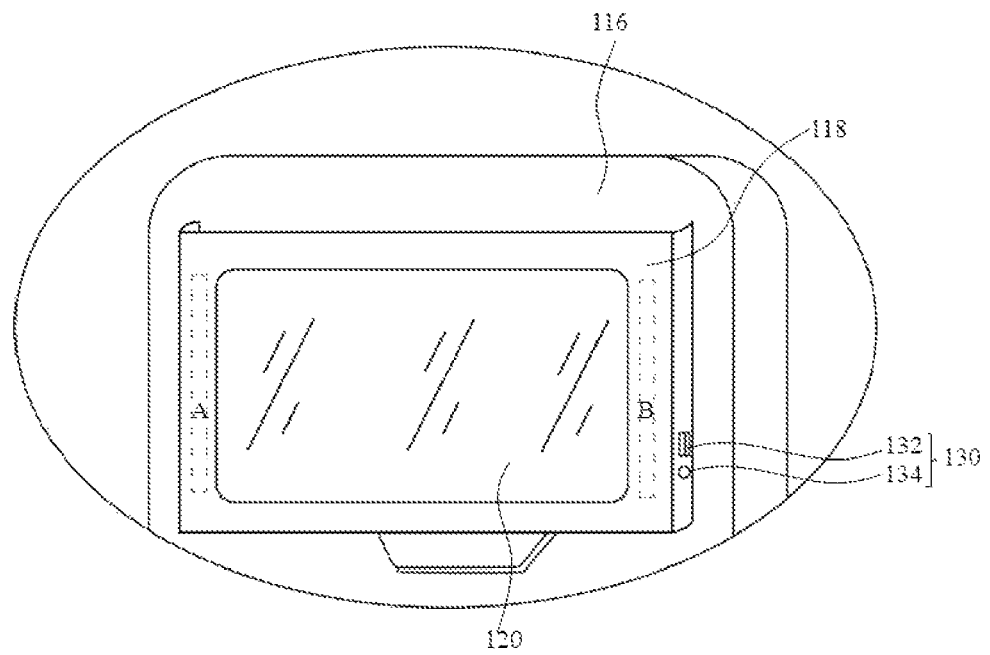
FIG. 7 is a partial view of the seat integrated with the passenger entertainment device according to an embodiment of the present disclosure.
Figure 8:
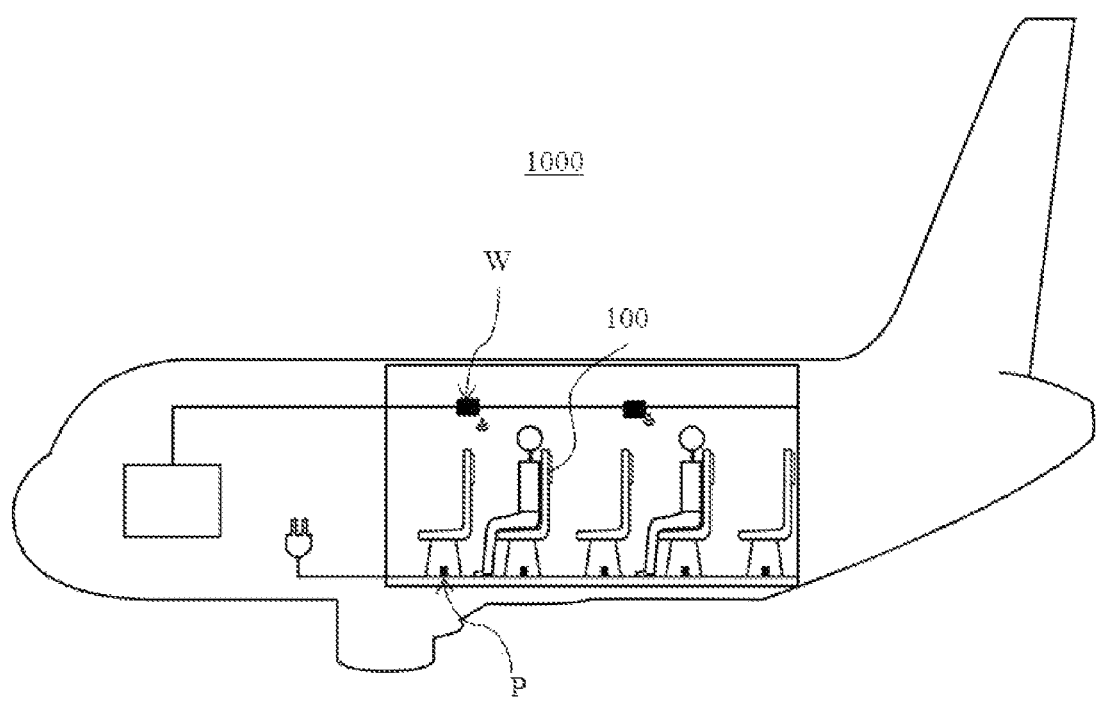
FIG. 8 is a sectional view of a vehicle according to an embodiment of the present disclosure.
Figure 11:
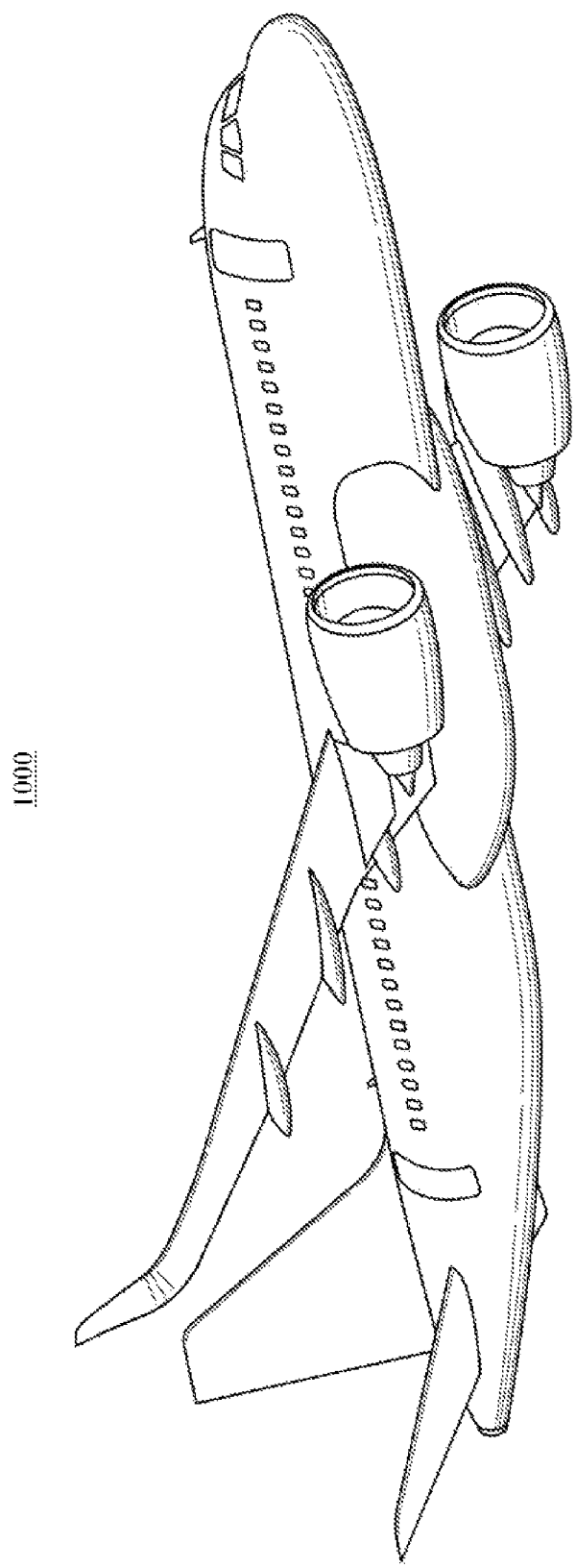
FIG. 11 is a perspective view of the vehicle according to an embodiment of the present disclosure.

FIGS. 2 to 8 illustrate a seat 100 according to a first embodiment of the present disclosure, which is suitable for a passenger cabin of a vehicle, in particular a passenger cabin of an aircraft 1000 as shown in FIGS. 8 and 11. In a first embodiment, the passenger entertainment device is integrated in a shell plate of a literature pocket. The details are as follows.

Figure 2:
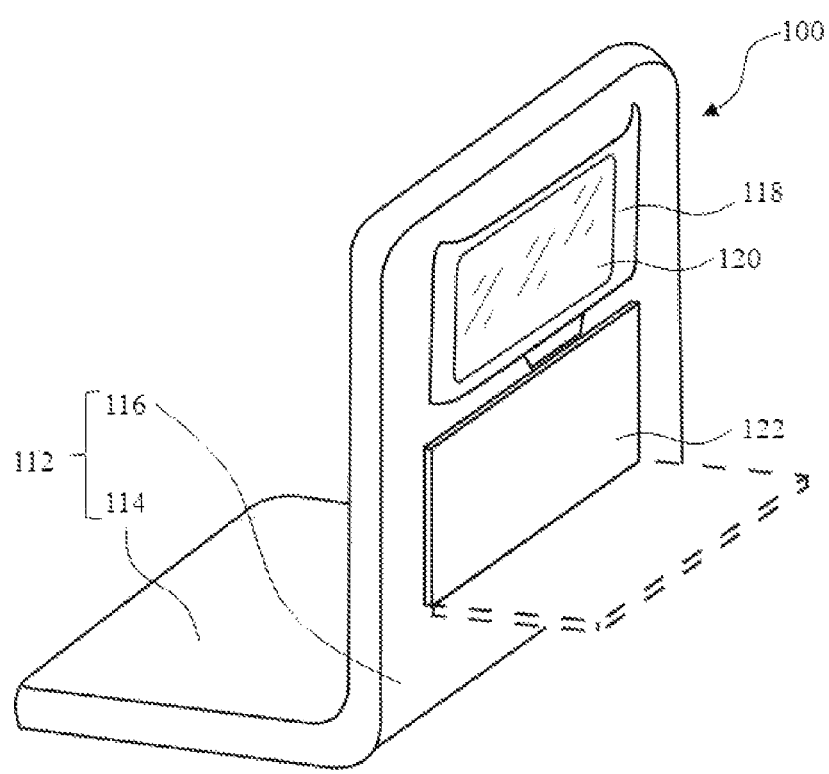
FIG. 2 is a perspective view of a seat integrated with a passenger entertainment device according to an embodiment of the present disclosure.

As shown in FIG. 2, the seat 100 includes a seat body 112 having a seat portion 114 and a backrest 116. A plastic shell plate 118 is provided in an upper region of a rear facing surface of the backrest 116 facing away from the seat portion 114. The shell plate 118 is attachable and detachable to the rear facing surface of the backrest 116 and, together with the rear facing surface of the backrest 116, defines a pocket-shaped portion with an open upper end. The pocket-shaped portion can be used for receiving, for example, newspapers and aircraft safety cards, that is, can be used as the literature pocket. The shell plate 118 herein is a typical embodiment of the cover member described above. Besides, a foldable tray table 122 is provided in an area of the rear facing surface of the backrest 116 below the shell plate 118. The foldable tray table 122 is movable between a folded position and an expanded position. In the folded position, the foldable tray table 122 extends substantially parallel to the rear facing surface of the backrest 116, and in the expanded position, the foldable tray table 122 defines a substantially horizontal plane.

As shown in FIGS. 2, 3, 6 and 7, a display screen 120 is installed on one side of the shell plate 118, and a controller 121 that controls the display content of the display screen 120 is provided on another side of the shell plate 118 opposite to the display screen. The display screen 120 and the controller 121 are integrated in the shell plate 118 to constitute the passenger entertainment device together with the shell plate 118. The passenger entertainment device may be detached from, or installed to, a corresponding portion of the backrest 116 as an integrated module. The structure of the shell plate 118 is based on the structure of the shell plate of the existing literature pocket, that is, a middle portion of the shell plate projects outward with respect to left, right, and lower portions of the shell plate, so that the shell plate together with the rear facing surface of the backrest 116 defines the literature pocket with an open upper end when the shell plate is installed to the backrest 116. The attachment method of the shell plate on the backrest 116 is also consistent with the existing attachment method, that is, the shell plate 118 is ready-made, and there is no need to change the original overall size and installation structure at the seat due to the integration of passenger entertainment device. Moreover, the shell plate 118 is provided with standard electrical connectors EC and mechanical connectors MC (as shown in FIG. 6). These standard connectors enable the shell plate 118 to possess universal adaptability, thus making the passenger entertainment device easy to be maintained and replaced, especially easy to exchange the shell plate with that of the existing seat without display screen, and further saves costs.

Figure 3:
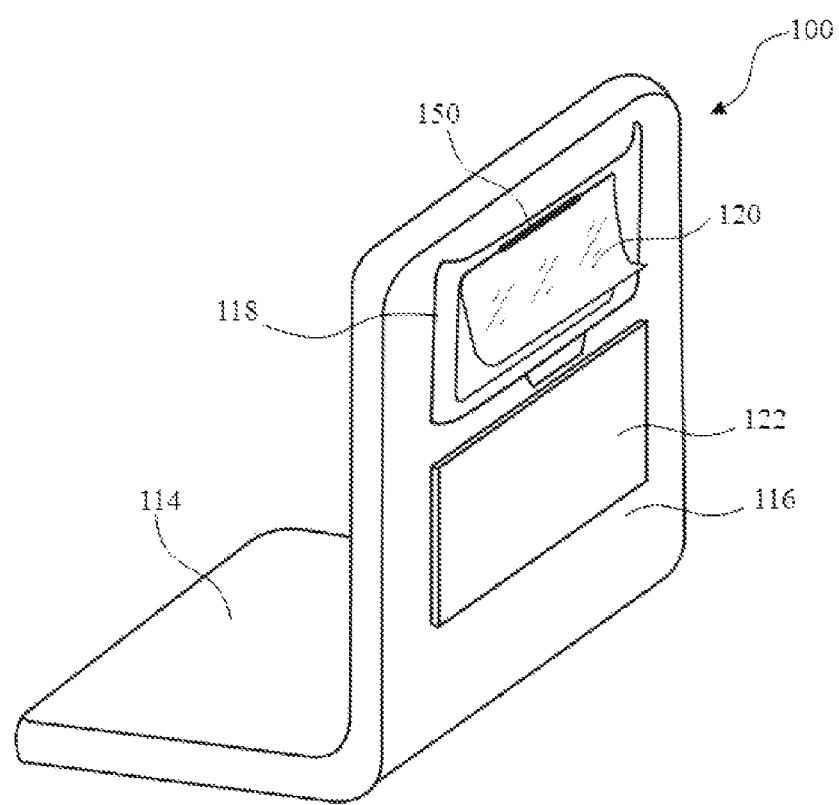
FIG. 3 is a perspective view of the seat integrated with the passenger entertainment device according to an embodiment of the present disclosure, in which a display screen is in a bent state.

Here, as shown in FIGS. 2 and 3, the display screen 120 is attached to a surface of the shell plate 118 facing the passenger behind the seat. Preferably, the display screen 120 is a flexible OLED (organic light-emitting diode) display screen, more preferably a touch-sensitive flexible OLED display screen to further improve user comfort. In particular, a thickness of the OLED display screen may be in a range of approximately 0.1 mm to 0.5 mm, preferably lower than 0.2 mm. As generally acknowledged in the industry, compared with conventional screens, the OLED display screen construction is relatively compact, thin and flexible and furthermore has the characteristics of being light weight and very efficient in terms of electrical energy consumption. Therefore, according to the present application, the embedding of the display screen 120 in the shell plate 118 will not cause an appreciable increase in the size or weight of the shell plate 118, nor take up an extra space between the seats. Further, since such solution allows the region of the backrest 116 below the knee level to be completely vacated, it is able to make the legroom maximized and thus improve the comfortable sensation of the passenger on the rear seat. In addition, flexible OLED display screens consume less electrical energy than other types of screens and are therefore advantageous to use in the passenger entertainment device.

As shown in FIG. 3, unlike the conventional complicated and bulky installation methods such as screws and frame fixing of conventional LED display screens, the flexible OLED display screen 120 can be fixed to the shell plate 118 in a more flexible and simple manner. As an example, the display screen 120 may be fixed to the shell plate 118 by a hinge device 150 as a connection mechanism. In the embodiment of the passenger entertainment device shown in FIG. 3, each of the shell plate 118 and the display screen 120 has a substantially rectangular shape. In this case, for example, the hinge device 150 may be arranged on an upper edge of the display screen 120, thereby allowing the display screen 120 to be flipped up and down relative to the shell plate 118 around a hinge position (more specifically, a pivot axis of the hinge device 150). Here, the hinge device 150 itself may have sufficient friction to keep the thin and light display screen 120 fixed at an appropriate angle, and to allow passengers to manually change the angle of the display screen 120. FIG. 3 exemplarily shows a changing state of the display screen 120. Obviously, the changing state of the display screen 120 can be changed according to passenger needs, and is not limited to the content shown in the figure.

In consideration of the variation in the inclination of backrest or the difference in body stature or size of the passengers, the passenger entertainment device of the present application allows passenger to adjust viewing angle as needed by changing the overall inclination angle of the display screen 120 with respect to the shell plate 118 and/or changing the shape and position of the display screen by means of the own flexibility of the display screen, which greatly improves the adjustability of the passenger entertainment device and improve the comfortable sensation of the passenger using the passenger entertainment device. In addition, the connection mechanism of the present application will enable to optimize the viewing angle without compromising the dimension of other structures of the seat, for example, the volume of the literature pocket, the thickness of backrest and the like. In this regard, it is conceivable that the type and arrangement position of the connection mechanism are not limited to the above-mentioned hinge device. For example, as a simplified method, the flexible OLED display screen 120 may be installed to the shell plate 118 by means of a magnetic connector, a clamping element or an adhesive agent, which further simplifies the installation and removal process. In addition, the connection mechanism is not necessarily arranged on the upper edge of the display screen 120, as long as the installation position of the connection mechanism is convenient for the user to adjust the display screen to a desired angle during the ride.

Figure 4:
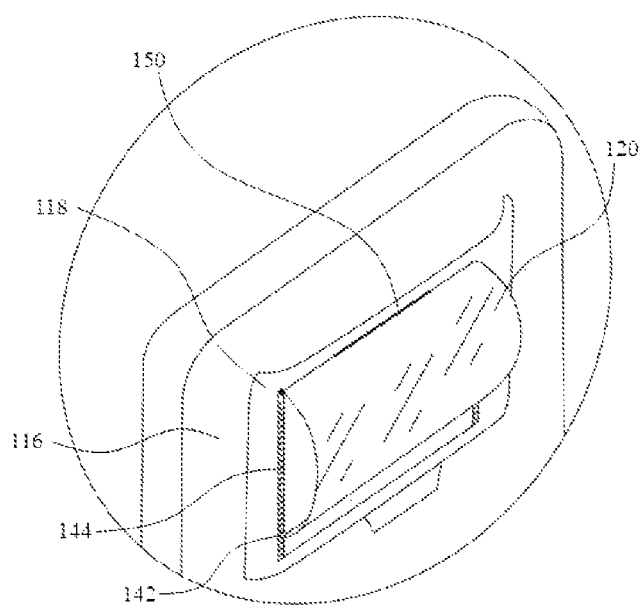
FIG. 4 is a partial view of the seat integrated with the passenger entertainment device according to an embodiment of the present disclosure, in which a kind of adjustment device is shown.
Figure 5:
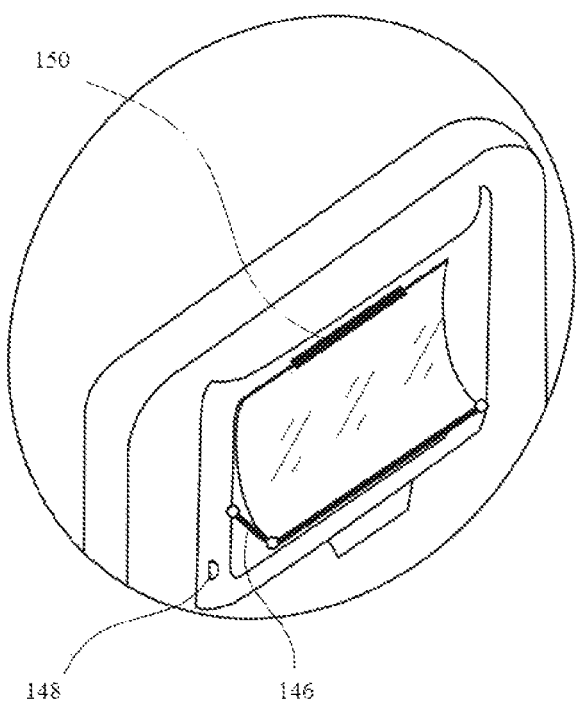
FIG. 5 is a partial view of the seat integrated with the passenger entertainment device according to another embodiment of the present disclosure, in which another kind of adjustment device is shown.

Further, an adjustment device capable of automatically adjusting the angle and curvature of the screen according to the needs of passengers may be provided between the display screen 120 and the shell plate 118 to facilitate the adjustment of the angle and curvature of the screen by the passengers. As shown in FIG. 4, the adjustment device includes a movable member 142 arranged on a side of the display screen 120 opposite to the connection mechanism, that is, a lower edge of the display screen 120. The movable member 142 is a slender rod-shaped member and is attached to the back side of the display screen 120 at the lower edge of the display screen 120. A plurality of stoppers 144 are provided at positions of the shell plate 118 adjacent to left and right edges of the display screen 120. The plurality of stoppers 144 are arranged at equal intervals in a vertical direction, and the plurality of stoppers 144 keep the movable member 142 at different positions of the display screen 120 in the vertical direction through the shape cooperation with the movable member 142, thereby enabling the display screen 120 to be deformed into different bent states and maintained in different bent states. Although the adjustment device is shown in an exaggerated manner in the figures for sake of clarity, in practice, the adjustment device may be arranged in a concealed manner. For example, the movable member 142 and the stoppers 144 may both be arranged on the back side of the display screen 120. The passenger only needs to adjust a tiny control element 148, such as a sliding key or a knob (as shown in FIG. 5), arranged on the shell plate 118 to change the position of the movable member 142 to adjust the curvature of the display screen 120.

The adjustment device shown in FIG. 4 is only an example, and instead of providing the stoppers 144, the movable member 142 may be kept at a certain position by friction to adjust the curvature the display screen 120, or by other structures, as long as the structure can change (reduce) a distance of one side edge of the flexible display screen 120 from a fixed edge, bending the flexible screen at different curvatures. In addition, the movable member 142 may not be adopted. For example, FIG. 5 shows a manner of providing a thin bracket 146 at the back of the display screen 120. As shown in the figure, a thin bracket 146 is exemplarily provided at right and left sides of the display screen, and is associated with the lower edge of the display screen. The passenger can change the angle and curvature of the display screen 120 by adjusting the inclination of the bracket 146. Preferably, the bracket 146 can be concealed behind the back surface of the display screen 120 in a horizontally-placing state, and therefore is not visible from the outside. The inclination angle of the bracket 146 can be adjusted by the control element 148 such as a knob arranged close to the screen.

Apparently, in addition to the above-mentioned methods, any other feasible adjustment device may be adopted. In short, the adjustment device according to the technical solution of the present disclosure can assist passengers to flexibly adjust the angle and curvature of the display screen, which makes the adjustment of the display screen more flexible, thus improving the customer's experience. In addition, the adjustment device of the present application will enable to optimize the viewing angle without compromising the dimension of other structures of the seat, for example, the volume of the literature pocket, the thickness of backrest and the like. Furthermore, such adjustment device has the characteristics of small size, light weight, and concealment, and does not affect the size, weight, and aesthetics of the passenger entertainment device.

FIG. 6 is a back view of the shell plate 118. As shown, the controller 121 is arranged on the back surface of the display screen and is installed on a surface of the shell plate 118 facing away from the passenger behind the seat. This arrangement can leave more arrangement space for the display screen 120, and make the surface facing the passenger simple and aesthetic. The controller 121 is configured to control the operation of the entire passenger entertainment device. In particular, the controller 121 receives power signals, data signals, in particular, video and audio data signals, as well as passenger instruction signals from the seat 100, a passenger device and the aircraft 1000 through existing power and data transmission devices, and thereby transmits the required power signals and signals processed by a processor inside the controller 121 to the display screen 120, so that the display screen 120 displays the customized content for the passenger. The existing power and data transmission devices may be, for example, cables. However, it is also conceivable to provide a wireless connection between the display screen 120 and the controller 121.

The passenger entertainment device according to the present disclosure further includes an interface accessory 130 which is integrated at an appropriate position in the shell plate 118 and is configured to allow external electronic devices (such as a passenger's mobile phone, a laptop computer, and the like) to perform data and/or power transmission with the passenger entertainment device. As shown in FIG. 7, the interface accessory 130 includes, for example, a universal type USB (Universal Serial Bus) interface 132 and an audio interface 134. In particular, the interface accessory 130 should be located outside a HIC (Head Injury Criteria) area to prevent the passenger's head from being injured due to collision. The interface accessory 130 may be located in areas A and B (indicated by dashed boxes in FIG. 7) close to the display screen on a front surface of the passenger entertainment device, or may be located on a side of the passenger entertainment device as shown in FIG. 7. The arrangement of arranging the interface accessory on the side of the passenger entertainment device can be more conducive to avoiding the injury possibility of the passenger's head.

Here, the passenger entertainment device may communicate with external electronic devices via a wireless connection (for example, Bluetooth) in addition to the interface accessory 130 described above. In a case that the passenger entertainment device communicates with an external electronic device such as a passenger's laptop, tablet and the like via a wired connection (such as a USB interface or other electronic communication element) or a wireless connection, the passenger entertainment device may further be used as an auxiliary device of the external electronic device, for example, as a keyboard, which further makes the passenger entertainment device of the present disclosure possess higher application versatility.

As shown in FIG. 8, the vehicle is equipped with a seat power supply system P. In this way, the passenger entertainment device can communicate with a power interface on the seat via the standard electrical connector on the shell plate, and thus the electronic components in the passenger entertainment device can be powered. In other words, the passenger entertainment device can be powered by a power source on the seat independently, which allows passengers to switch ON/OFF the passenger entertainment device according to personal requirements and thus is not only beneficial to meet the personal electricity demand of passengers, but also reduce energy consumption Besides, as shown in FIG. 8, a network system is provided in the vehicle. Preferably, the network system is a wireless network system (Wifi), as indicated by W in FIG. 8. The passenger entertainment device can obtain data from the wireless network system, which allows passengers to search, select and view the contents they are interested in freely, and thus can better meet the customized information requirements of passengers and improve the ride comfort of passengers. Alternatively or optionally, the passenger entertainment equipment may obtain data from a wire network system of the vehicle via data wires.

Figure 9A:
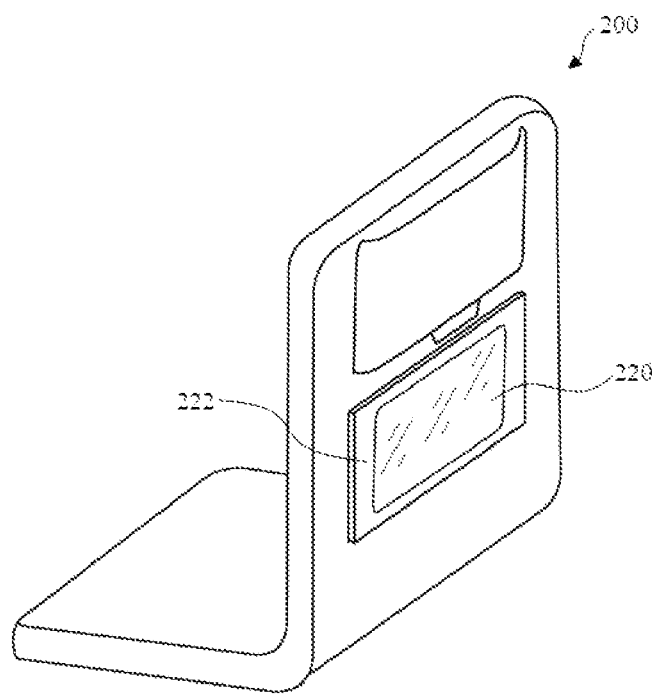
FIGS. 9A and 9B are perspective views of the seat integrated with the passenger entertainment device according to a variant embodiment of the present disclosure.
Figure 9B:
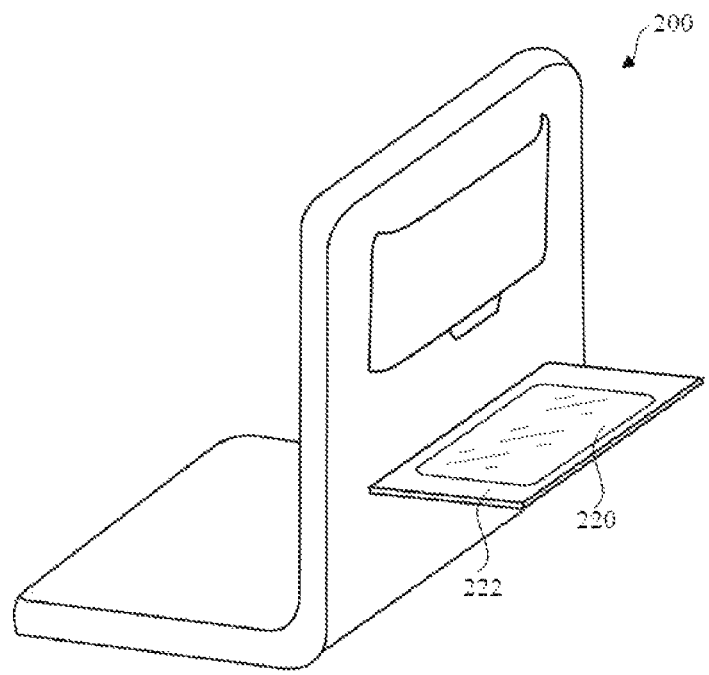

FIGS. 9A and 9B show a passenger seat 200 according to another embodiment, in which the passenger entertainment device includes a foldable tray table 222 and a display screen 220 and a controller (not shown) integrated with the foldable tray table 222, that is, the foldable tray table 222 serves as the cover member of the integrated passenger entertainment device. The foldable tray table 222 can be moved between a folded position and an expanded position. The passenger entertainment device may be provided on a first surface of the foldable tray table 222 facing the rear-seat passenger when the foldable tray table 222 is in the folded position, as shown in FIG. 9A; or may be provided on a second surface of the foldable tray table 222 facing the rear-seat passenger when the foldable tray table 222 is in the expanded position, as shown in FIG. 9B, that is, the surface opposite to the first surface; or may be arranged on both the first surface and the second surface. In this case, the display screen 220 may be fixed to the foldable tray table 222 at the lower edge thereof, and the rest of the accessories including the connection mechanism, the adjustment device, the power and data transmission device, the mechanical connection device, the interface accessory, and the like may be provided in the same or similar manner as the foregoing embodiments.

The integrated passenger entertainment device according to the present disclosure has significant advantages when applied to the seat of a vehicle. The advantages include, but are not limited to: i) compared with the existing passenger entertainment device for a seat, the integrated passenger entertainment device is very thin and light, which is conducive to saving space and weight; ii), the integrated passenger entertainment device is directly integrated into the existing functional accessories, which can be integrated into the seat without adjusting the seat, and the electronic and mechanical interfaces and connectors used thereon are all universal or standard interfaces and connectors, which further ensures that the integrated passenger entertainment device can be quickly and cost-effectively integrated into the existing seats and ensures the quick and cost-effective retrofitting of the existing seats, so the integrated passenger entertainment device according to the present disclosure is a highly adaptable and easy-to-maintain passenger entertainment device; iii), the screen of the integrated passenger entertainment device is a flexible OLED screen, and as mentioned above, the angle and curvature of the flexible OLED screen can be arbitrarily adjusted so as to meet different requirements on the viewing angles of various passengers, the flexible OLED screen can be powered independently by the seat power source, and the data is provided through WiFi such that passengers can freely choose their favorite content in a wider range, thus in terms of either the viewing method or the viewing content, the integrated passenger entertainment device according to the present disclosure has greater optionality and can adequately meet the customized requirements of passengers; iv), the flexible OLED screen itself has low power consumption, and such integrated design can save development and manufacturing costs, thus the passenger entertainment device is cost-saving; and v), the safety of the seat is ensured by providing the flexible display screen and by arranging the connectors and the interface accessories outside the HIC area.

Figure 10A:
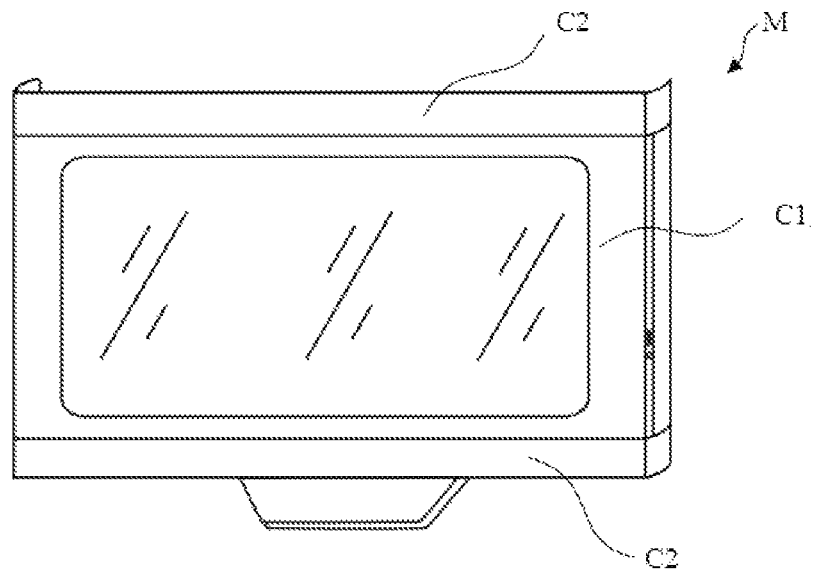
FIGS. 10A and 10B are schematic views of a modular integrated passenger entertainment device according to an embodiment of the present disclosure.
Figure 10B:
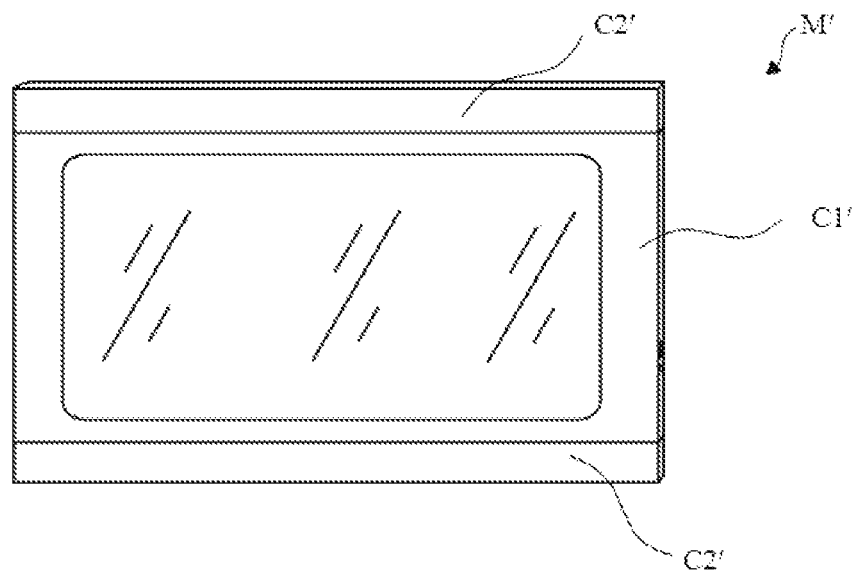

Apparently, the embodiments of the present disclosure are not limited to those illustrated herein, and those skilled in the art can make any modification according to the concept of the present disclosure. For example, based on the embodiments shown above, as a more preferred embodiment, a modular integrated passenger entertainment device as shown in FIG. 10A and FIG. 10B may be provided, which is characterized in having a "modular cover member". Compared with the "cover member" described above with "the shell plate 118 of the literature pocket" and "foldable tray tables 122, 222" as examples, the "modular cover member" may be a more flexible member.

As an example, FIG. 10A illustrates a modular integrated passenger entertainment device M for replacing the shell plate of the literature pocket, wherein a modular cover member C may include a standard portion C1 having a fixed shape and size and a customizable portion C2 of which the shape and size are capable of being adapted to the configuration of the seat, in particular to the configuration of the seat accessories. The display screen and the controller are arranged on the standard portion C1, thereby jointly defining a main part of the modular integrated passenger entertainment device. The main part integrates almost all the display functions of the passenger entertainment device. The customizable portion C2 can be adapted to a shape that supplements the shape of the standard portion C1 so that the customizable portion C2 may constitute the shell plate of the literature pocket together with the standard portion C1.

For example, FIG. 10B shows a modular integrated passenger entertainment device M' for replacing the foldable tray table. Since the shape and size of the foldable tray table are different from the shape and size of the aforementioned shell plate of the literature pocket, a modular cover member C' of the modular integrated passenger entertainment device M' has a different shape from the aforementioned modular cover member C. In the modular cover member C', a standard portion C1' is necessary to be changed, that is, the standard portion C1' is identical with the aforementioned standard portion C1, and only the shape of a customizable portion C2' is adjusted so that the modular cover member C' obtained by the assembly of the standard portion C1' and the customizable portion C2' can be used to replace the existing foldable tray table directly.

This modular integrated passenger entertainment device will further highlight the advantages of the present disclosure. In a case that the integrated passenger entertainment device is applied to different styles and models of seats, only adjustment to the customizable portion of the integrated passenger entertainment device is necessary, while modification to the existing seat may be minimum or even zero. This configuration makes it possible to use as many consistent parts as possible when producing this integrated passenger entertainment device. Therefore, the passenger entertainment device according to the present disclosure is convenient for mass production, especially when replacing the existing seat accessories, and is helpful for reducing development work, thus can not only improve production efficiency, but also help to save production costs.

In summary, although the present disclosure has been described with reference to exemplary embodiments, it is conceivable that the present disclosure is not limited to the specific embodiments or examples described and illustrated in detail herein, and various changes may be made to the exemplary embodiments by those skilled in the art without departing from the scope defined by the appended claims.

The invention claimed is:

1. An aircraft passenger entertainment device for being integrated in an aircraft passenger seat, the entertainment device comprising:
    a cover member which is attached to the seat so as to serve as a functional accessory for providing additional functions other than a seating function to the seat;

a display screen, which is movably attached to at least one surface of the cover member; an adjustment device for adjusting the curvature of the display screen by changing a distance between two opposite edges of the display screen;

a controller, which is embedded on a surface or inside of the cover member and is in communication with the display screen; and, wherein the cover member is configured to be removably attached to a rear facing surface of a backrest of the seat above a passenger knee level.

2. The aircraft passenger entertainment device according to claim 1, wherein the display screen is a flexible OLED display screen.

3. The aircraft passenger entertainment device according to claim 1, wherein the cover member includes:

a standard portion having a fixed shape, to which the display screen and the controller are installed so as to constitute a main part of the aircraft passenger entertainment device together with the standard portion; and a customizable portion, of which a shape is capable of being adaptively changed so that the customizable portion and the standard portion can constitute the functional accessory together.

4. The aircraft passenger entertainment device according to claim 2, further comprising a connection mechanism which fixes the display screen to the cover member, wherein the connection mechanism is configured to allow a change of angle and/or position of the display screen with respect to the cover member.

5. The aircraft passenger entertainment device according to claim 4, wherein the connection mechanism is a hinge device which allows the display screen to pivot with respect to the cover member.

6. The aircraft passenger entertainment device according to claim 4, wherein the connection mechanism is a magnetic connector, a clamping element or an adhesive agent being arranged to allow the display screen to change its curvature by its own flexibility.

7. The aircraft passenger entertainment device according to claim 1, wherein the adjustment device further includes a control element arranged on the cover member, which enables passengers to control the adjustment device by operating the control element so as to adjust the curvature of the display screen.

8. The aircraft passenger entertainment device according to claim 2, wherein the display screen is a touch-sensitive OLED display screen.

9. The aircraft passenger entertainment device according to claim 1, wherein the cover member is embodied as a shell plate of a literature pocket attached to the upper part of the backrest of the seat, and wherein the display screen is arranged on a side of the shell plate of the literature pocket facing passengers in a rear row.

10. The aircraft passenger entertainment device according to claim 1, wherein the cover member is embodied as a conventional foldable tray table attached to the backrest of the seat, and wherein the display screen is arranged on a first surface of the foldable tray table facing the passenger behind the seat in a folded position; or is arranged on a second surface of the foldable tray table opposite to the first surface; or is arranged on both the first surface and the second surface.

11. The aircraft passenger entertainment device according to claim 1, wherein the aircraft passenger entertainment device obtains data via a wireless network system.

12. The aircraft passenger entertainment device according to claim 1, wherein the aircraft passenger entertainment device is independently powered via a power source of the seat.

13. The aircraft passenger entertainment device according to claim 1, further comprising an interface accessory which allows an external electronic device to perform data transmission with the aircraft passenger entertainment device, wherein the interface accessory is integrated in the cover member and located outside an HIC area.

14. The aircraft passenger entertainment device according to claim 13, wherein the interface accessory includes a USB interface and an audio interface.

15. The aircraft passenger entertainment device according to claim 1, wherein the aircraft passenger entertainment device is capable of being used as a keyboard of an external electronic device.

16. The aircraft passenger entertainment device according to claim 1, wherein the aircraft passenger entertainment device is installed to the seat via standard electrical connectors and standard mechanical connectors.

17. An aircraft passenger seat comprising:

a seat body, which includes a seat portion and a backrest; and at least one functional accessory, which is attached to the seat body to provide additional functions other than a seating function to the seat; and, wherein the at least one functional accessory is the functional accessory of claim 1.

18. An aircraft equipped with one or more aircraft passenger entertainment device(s) according to claim 1.

19. The aircraft according to claim 18, further provided with:

a wireless network system, which is capable of providing data for the aircraft passenger entertainment device(s); and a seat power supply system, which includes seat power source provided on each aircraft passenger seat to enable independent powering of the aircraft passenger entertainment device installed on the aircraft passenger seat.

* * * * *